United States Patent
Hancock, Jr. et al.

(10) Patent No.: US 12,378,151 B2
(45) Date of Patent: Aug. 5, 2025

(54) PHASE-SEPARATED GLASS COMPOSITIONS

(71) Applicant: Corning Incorporated, Corning, NY (US)

(72) Inventors: Robert Randall Hancock, Jr., Corning, NY (US); Aize Li, Painted Post, NY (US); Liying Zhang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 148 days.

(21) Appl. No.: 17/743,703

(22) Filed: May 13, 2022

(65) Prior Publication Data

US 2022/0371939 A1    Nov. 24, 2022

Related U.S. Application Data

(60) Provisional application No. 63/190,877, filed on May 20, 2021.

(51) Int. Cl.
*C03C 3/089* (2006.01)
*C03B 32/00* (2006.01)

(52) U.S. Cl.
CPC .............. *C03C 3/089* (2013.01); *C03B 32/00* (2013.01)

(58) Field of Classification Search
None
See application file for complete search history.

(56) References Cited

U.S. PATENT DOCUMENTS

| | | | |
|---|---|---|---|
| 2,106,744 A | 2/1938 | Porter et al. | |
| 3,843,341 A | 10/1974 | Hammel et al. | |
| 9,278,882 B2 | 3/2016 | Takashima et al. | |
| 2013/0011551 A1* | 1/2013 | Zhou | C03C 3/06 977/840 |
| 2013/0067957 A1 | 3/2013 | Zhang et al. | |
| 2013/0068725 A1* | 3/2013 | Takashima | C03C 15/00 216/56 |
| 2013/0157026 A1* | 6/2013 | Kotani | C03C 3/091 501/53 |
| 2013/0233018 A1* | 9/2013 | Takashima | C03C 21/002 65/30.13 |
| 2016/0340226 A1* | 11/2016 | Dutta | C03C 23/009 |
| 2017/0174559 A1* | 6/2017 | DeLamielleure | C03C 3/093 |

(Continued)

FOREIGN PATENT DOCUMENTS

| GB | 1430095 A | 3/1976 |
|---|---|---|
| JP | 11-016244 A | 1/1999 |

OTHER PUBLICATIONS

O'Brien et al; "Transparent Nanoporous Glass-Polymer Composite for U.S. Army Applications"; Army Research Laboratory; ARL-TR-4631, (2008) 22 Pages.

(Continued)

*Primary Examiner* — Chinessa T. Golden

(57) ABSTRACT

A borosilicate-based composition, including: 50-85 mol. % $SiO_2$, 10-40 mol. % $B_2O_3$, >0-5 mol. % $SnO_2$, and >0-20 mol. % of at least one alkali oxide selected from $Li_2O$, $Na_2O$, $K_2O$, $Rb_2O$, and $Cs_2O$, such that the composition has a Young's Modulus less than 64 GPa.

20 Claims, 13 Drawing Sheets

(56) References Cited

U.S. PATENT DOCUMENTS

2020/0407267 A1* 12/2020 Nomura .................. C03C 3/087
2021/0070650 A1*  3/2021 Da ......................... C03C 3/097

OTHER PUBLICATIONS

Taylor, "A Review of Phase Separation in Borosilicate Glasses, With Reference to Nuclear Fuel Waste Immobilization", Atomic Energy of Canada Limited, AECL-10173, (1990), pp. 55.

Hill et al., "An investigation of amorphous phase separation, leachability and surface area of an ionomer glass system and a sodium-boro-silicate glass system", Journal of Materials Science 38 (2003), pp. 3891-3902.

* cited by examiner

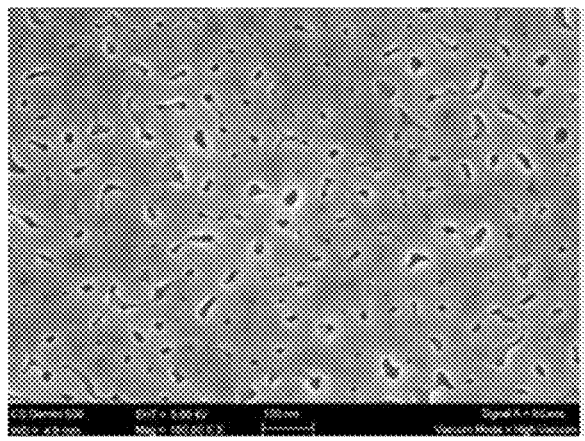
FIG. 1G
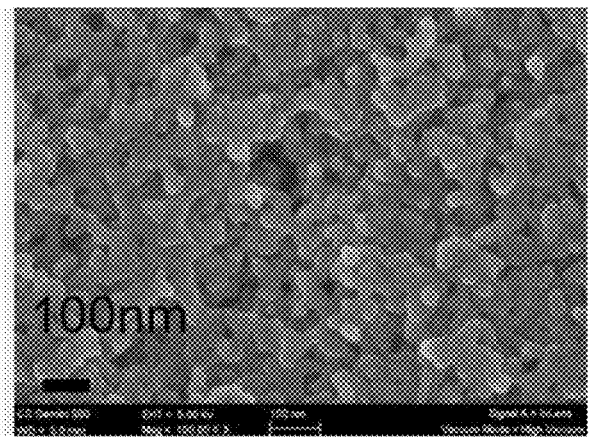
FIG. 1H
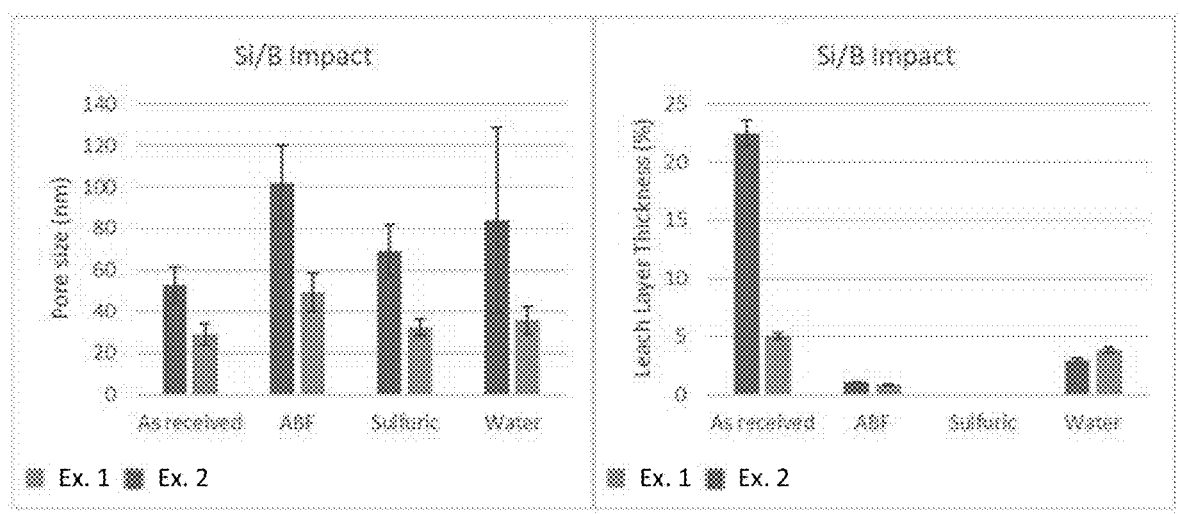
FIG. 2A
FIG. 2B

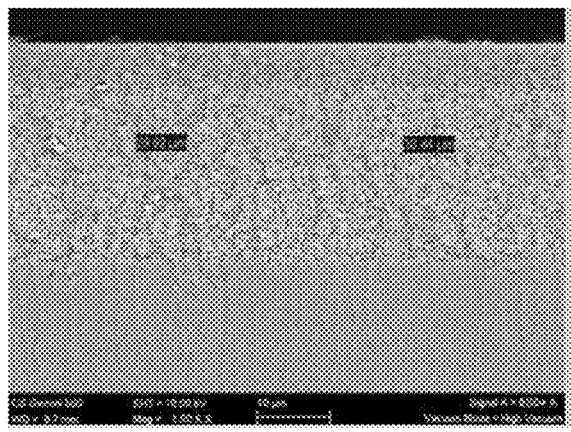
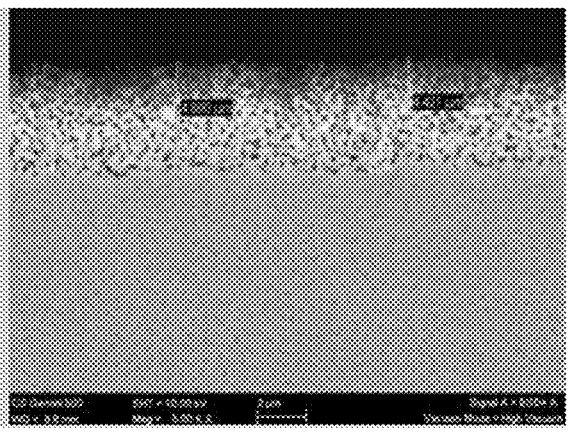
FIG. 6A　　　　　　　　　　　　　FIG. 6B
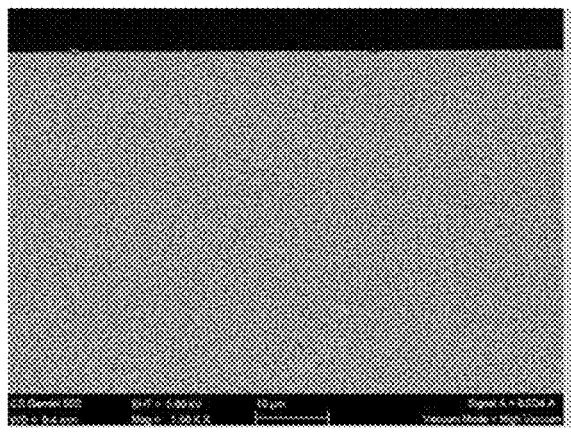
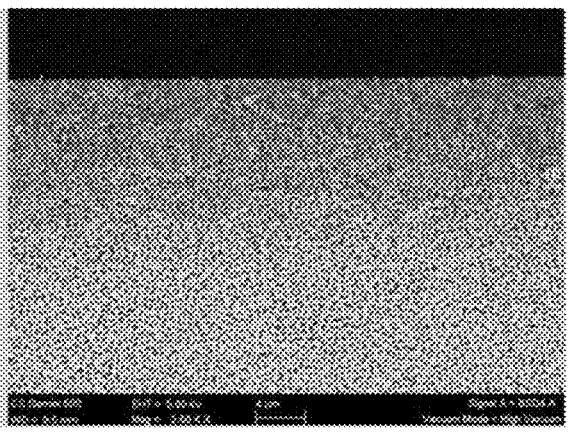
FIG. 6C　　　　　　　　　　　　　FIG. 6D

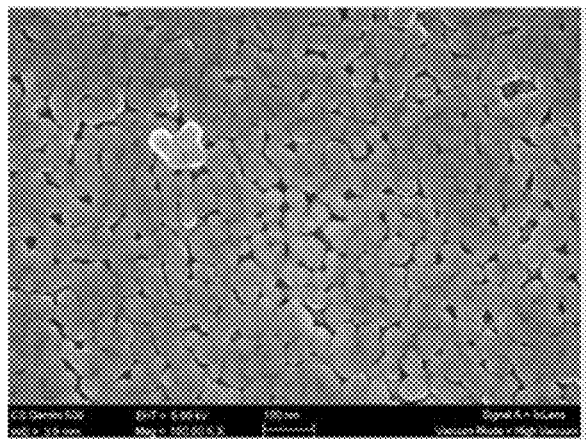
FIG. 10G
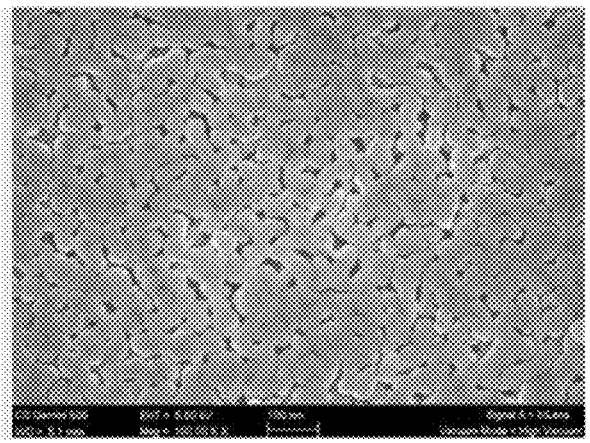
FIG. 10H
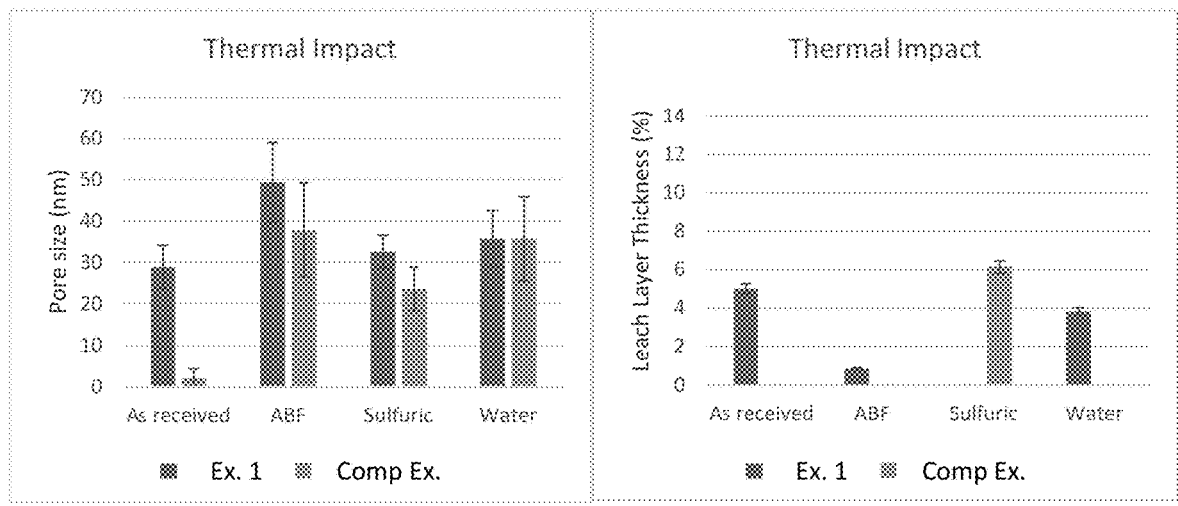
FIG. 11A
FIG. 11B

PHASE-SEPARATED GLASS COMPOSITIONS

CROSS-REFERENCE TO RELATED APPLICATIONS

This application claims the benefit of priority under 35 U.S.C. § 120 of U.S. Application Ser. No. 63/190,877, filed on May 20, 2021, the content of which is relied upon and incorporated herein by reference in its entirety.

BACKGROUND

1. Field

The disclosure relates to inorganic compositions for foldable display applications.

2. Technical Background

Amorphous phase separation is a common occurrence in silicate and borosilicate glasses and often leads to important properties and applications, such as cook top, biomolecule immobilization, solar, sensor, membrane, anti-microbial, and optical fiber applications. Because phase separation may significantly impact glass properties, such as glass durability in aqueous solutions, this phenomenon has been extensively studied.

Modern applications often call for glasses comprising through-glass porous structures for foldable display materials. However, currently available glasses being investigated for foldable displays often require long thermal treatment times and long acid treatment times (e.g., 24 hrs) to form through-glass porous structures.

This disclosure presents improved inorganic compositions for foldable display applications.

SUMMARY

In some embodiments, a borosilicate-based composition, comprises: 50-85 mol. % $SiO_2$, 10-40 mol. % $B_2O_3$, >0-5 mol. % $SnO_2$, and >0-20 mol. % of at least one alkali oxide selected from $Li_2O$, $Na_2O$, $K_2O$, $Rb_2O$, and $Cs_2O$, wherein the composition has a Young's Modulus less than 64 GPa.

In one aspect, which is combinable with any of the other aspects or embodiments, the at least one alkali oxide is $Li_2O$ present in an amount of >0-10 mol. %. In one aspect, which is combinable with any of the other aspects or embodiments, the at least one alkali oxide is $Na_2O$ present in an amount of >0-10 mol. %. In one aspect, which is combinable with any of the other aspects or embodiments, the at least one alkali oxide is $K_2O$ present in an amount of >0-10 mol. %. In one aspect, which is combinable with any of the other aspects or embodiments, the at least one alkali oxide is at least one of >0-10 mol. % $Na_2O$ or >0-10 mol. % $K_2O$. In one aspect, which is combinable with any of the other aspects or embodiments, the $B_2O_3$ is present in an amount >15 mol. %.

In one aspect, which is combinable with any of the other aspects or embodiments, a through-glass porous structure comprises the borosilicate composition disclosed herein. In one aspect, which is combinable with any of the other aspects or embodiments, the porous structure has a pore size in a range of 100-400 nm and a depth of porous structure in a range of 50 μm to 600 μm. In one aspect, which is combinable with any of the other aspects or embodiments, the porous structure comprises a silica:boron ratio in a range of 0.1:1 to 0.5:1.

In one aspect, which is combinable with any of the other aspects or embodiments, a glass surface porous structure comprises the borosilicate composition disclosed herein. In one aspect, which is combinable with any of the other aspects or embodiments, the porous structure has a pore size in a range of 20-100 nm and a depth of porous structure in a range of less than 1 μm to 20 μm. In one aspect, which is combinable with any of the other aspects or embodiments, the porous structure has a silica:boron ratio in a range of 0.1:1 to 0.5:1.

In one aspect, which is combinable with any of the other aspects or embodiments, a foldable display device comprises the borosilicate composition disclosed herein.

In some embodiments, a method for manufacturing a glass substrate, comprises: providing a glass article; and thermally treating the glass article to a maximum temperature in a range of 500-750° C., wherein the glass article comprises: 50-85 mol. % $SiO_2$, 10-40 mol. % $B_2O_3$, >0-5 mol. % $SnO_2$, and >0-20 mol. % of at least one alkali oxide selected from $Li_2O$, $Na_2O$, $K_2O$, $Rb_2O$, and $Cs_2O$.

In one aspect, which is combinable with any of the other aspects or embodiments, the at least one alkali oxide is $Li_2O$ present in an amount of >0-10 mol. %. In one aspect, which is combinable with any of the other aspects or embodiments, the at least one alkali oxide is at least one of >0-10 mol. % $Na_2O$ or >0-10 mol. % $K_2O$.

In one aspect, which is combinable with any of the other aspects or embodiments, the step of thermally treating comprises: a ramping sub-step of heating the glass article from room temperature to the maximum temperature; a holding sub-step of maintaining the glass article at the maximum temperature; and a cooling sub-step of cooling the glass article from the maximum temperature to room temperature. In one aspect, which is combinable with any of the other aspects or embodiments, the step of thermally treating is conducted in a total lapse time of not more than 5 hrs. In one aspect, which is combinable with any of the other aspects or embodiments, the glass substrate has a pore size in a range of 20-75 nm and a depth of porous structure in a range of less than 1 μm to 30 μm. In one aspect, which is combinable with any of the other aspects or embodiments, the step of thermally treating is conducted in a total lapse time exceeding 24 hrs. In one aspect, which is combinable with any of the other aspects or embodiments, the holding sub-step of maintaining the glass article at the maximum temperature is conducted for a time in a range of 30 min to 1.5 hrs.

BRIEF DESCRIPTION OF THE DRAWINGS

The disclosure will become more fully understood from the following detailed description, taken in conjunction with the accompanying figures, in which:

FIGS. 1A-1H illustrate top scanning electron microscopy (SEM) images of a top (or bottom) surface of Example 1 (FIGS. 1E-1H) and Example 2 (FIGS. 1A-1D) as-received (FIGS. 1A and 1E), leached in ammonium bifluoride (ABF) (FIGS. 1B and 1F), leached in sulfuric acid (FIGS. 1C and 1G), and leached in water (FIGS. 1D and 1H), according to some embodiments.

FIGS. 2A and 2B illustrate pore size (FIG. 2A) and porous layer thickness (FIG. 2B) of Examples 1 and 2, according to some embodiments.

FIG. 3A) and a high-silica, phase-separated glass (Example 1; FIG. 3B), according to some embodiments.

FIGS. 6A-6D illustrate fractured cross-section SEM images of as-received Example 6 (FIG. 6A), leached in ABF (FIG. 6B), leached in sulfuric acid (FIG. 6C), and leached in water (FIG. 6D), according to some embodiments.

FIG. 8A), sodium (Example 3, FIG. 8B), and potassium (Example 5, FIG. 8C), according to some embodiments.

FIGS. 10A-10H illustrate top SEM images of a top (or bottom) surface of Example 1 (FIGS. 10A-10D) and Comparative Example (FIGS. 10E-10H) as-received (FIGS. 10A and 10E), leached in ABF (FIGS. 10B and 10F), leached in sulfuric acid (FIGS. 10C and 10G), and leached in water (FIGS. 10D and 10H), according to some embodiments.

FIGS. 11A and 11B illustrate pore size (FIG. 11A) and porous layer thickness (FIG. 11B) of Example 1 and Comparative Example, according to some embodiments.

FIG. 12A) and a long thermal treatment (Comparative Example; FIG. 12B), according to some embodiments.

DETAILED DESCRIPTION

Figure 1A:
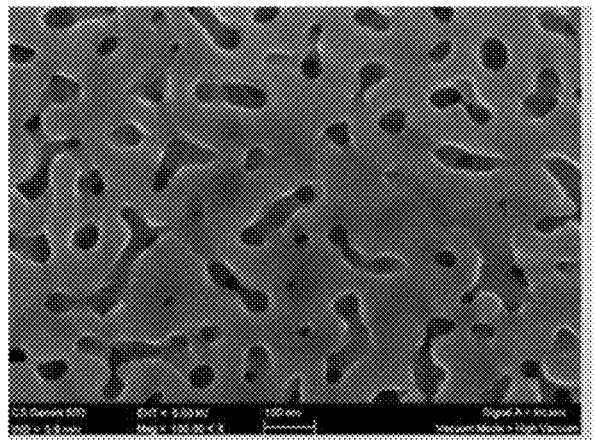
Figure 1B:
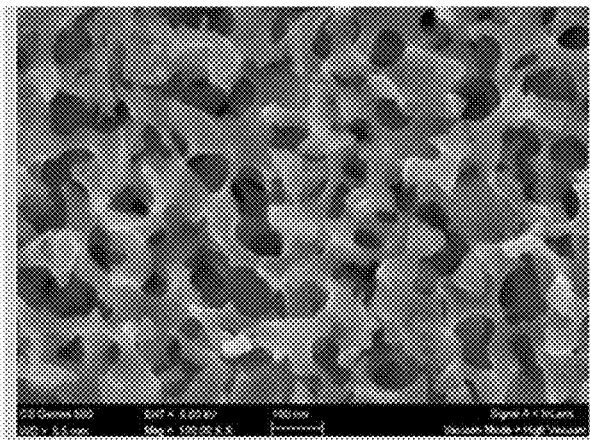
Figure 1C:
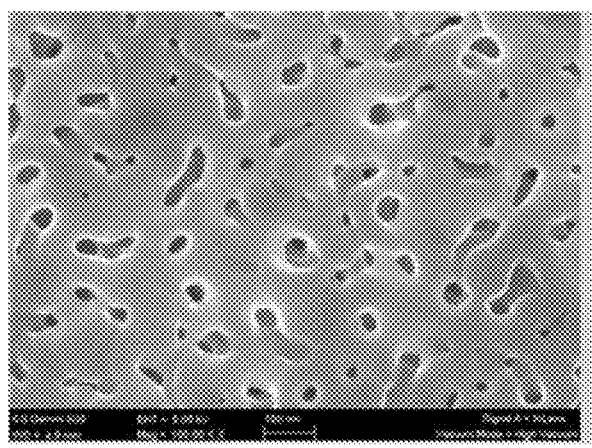

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass that is "free" or "essentially free" of $Al_2O_3$ is one in which $Al_2O_3$ is not actively added or batched into the glass, but may be present in very small amounts as a contaminant (e.g., 500, 400, 300, 200, or 100 parts per million (ppm) or less or).

Herein, glass compositions are expressed in terms of mol. % amounts of particular components included therein on an oxide bases unless otherwise indicated. Any component having more than one oxidation state may be present in a glass composition in any oxidation state. However, concentrations of such component are expressed in terms of the oxide in which such component is at its lowest oxidation state unless otherwise indicated.

As described above, modern applications often call for glasses comprising through-glass porous structures for foldable display materials. Currently available glasses being investigated for foldable displays often require long thermal treatment times and long acid treatment times (e.g., 24 hrs) to form through-glass porous structures. To solve this problem, a series of novel glass compositions are disclosed which show potential for phase separation and etching to create pore structures. The glass compositions may comprise $Na_2O$, $K_2O$, and/or $Li_2O$ as the alkali identity in quantities where phase separation may arise. Phase diagrams are shown where glass composition may phase separate, with and without thermal treatment. In some embodiments, glasses comprising Li components have larger ranges of compositions that can exhibit phase separation without a thermal treatment, in addition to the normal glass melting process. By tuning glass composition, thermal treatment, and wet dissolution conditions, a novel green process is disclosed to fabricate through-glass porous structures in the compositions disclosed herein, with the process having shortened thermal treatment times and shortened solution treatment times.

Glass Compositions

In the glass compositions described herein, $SiO_2$ serves as the primary glass-forming oxide in combination with $B_2O_3$, tin oxide, and at least one alkali oxide. In some examples, the glass comprises a combination of $SiO_2$, $B_2O_3$, and $SnO_2$. In some examples, the glass further comprises at least one alkali oxide ($Li_2O$, $Na_2O$, $K_2O$, $Rb_2O$, and $Cs_2O$).

For example, the glass may comprise a composition including, in mol. %: 50-85% $SiO_2$, 10-40% $B_2O_3$, and >0-5% $SnO_2$. In some examples, the glass may further comprise, in mol. %:>0-20% alkali oxide. In some examples, the glass may comprise, in mol. %: 0-20% $Li_2O$. In some examples, the glass may comprise, in mol. %: 0-20% $Na_2O$. In some examples, the glass may comprise, in mol. %: 0-20% $K_2O$. The glasses disclosed herein are particularly suitable for foldable display applications.

Silicon dioxide ($SiO_2$), which serves as the primary glass-forming oxide component of the embodied glasses, may be included to provide high temperature stability and chemical durability. In some embodiments, the glass can comprise 50-85 mol. % $SiO_2$. In some examples, the glass may comprise 65-80 mol. % $SiO_2$. In some examples, the glass can comprise 50-85 mol. %, or 50-80 mol. %, or 55-80 mol. %, or 55-75 mol. %, or 60-75 mol. % $SiO_2$, or any value or range disclosed therein. In some examples, the glass comprises 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 mol. % $SiO_2$, or any value or range having endpoints disclosed herein.

In some examples, the glass can comprise 10-40% mol. % $B_2O_3$. In some examples, the glass can comprise 15-30 mol. % $B_2O_3$. In some examples, the glass can comprise from 10-40 mol. %, or 15-40 mol. %, or 15-35 mol. %, or 20-35 mol. % $B_2O_3$, or any value or range disclosed therein. In some examples, the glass comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 mol. % $B_2O_3$, or any value or range having endpoints disclosed herein. In one aspect, $B_2O_3$ may function as a second glass network former. Boron-containing glasses may result in phase separation during glass melting. The addition of $B_2O_3$ in glass compositions facilitates the phase separation and thereby, pore structure development afterwards. In other words, glasses containing both $SiO_2$ and $B_2O_3$ may form two immiscible liquids in some temperature window from melting or reheating. The immiscibility of silicate and borate glass creates phase separation, with morphology varying with composition and thermal history.

In some examples, the glass can comprise >0-5% mol. % tin oxide. In some examples, the glass can comprise >0-5% mol. % $SnO_2$. In some examples, the glass can comprise >0-2.5 mol. % $SnO_2$. In some examples, the glass can comprise from >0-5 mol. %, or >0-4 mol. %, or >0-3 mol. %, or >0-2 mol. % $SnO_2$, or any value or range disclosed therein. In some examples, the glass comprises 0, >0, 0.01, 0.02, 0.025, 0.05, 0.075, 0.1, 0.2, 0.25, 0.5, 0.75, 1.0, 1.25, 1.5, 1.75, 2.0, 2.25, 2.5, 2.75, 3.0, 3.5, 4.0, 4.5, or 5.0 mol. % $SnO_2$, or any value or range having endpoints disclosed herein. $SnO_2$ functions as a fining agent in glass melting. Higher $SnO_2$ (e.g., in some embodiments, greater than 5 mol. %) may lead to a higher risk of undesired cassiterite inclusions in the final glass.

In some examples, the glass may further comprise, in mol. %: >0-20% $R_2O$, where $R_2O$ comprises at least one of $Li_2O$, $Na_2O$, $K_2O$, $Rb_2O$, and $Cs_2O$. In some examples, the glass can comprise from >0-20 mol. %, or >0-17.5 mol. %, or 2-17.5 mol. %, or 2-15 mol. %, or 3-15 mol. %, or 3-12.5 mol. %, or 4-12.5 mol. %, or 4-10 mol. % $R_2O$, or any value or range disclosed therein. In some examples, the glass comprises 0, >0, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 11.0, 12.0, 13.0, 14.0, 15.0, 16.0, 17.0, 18.0, 19.0, or 20.0 mol. % $R_2O$, or any value or range having endpoints disclosed herein. Alkali oxides ($Na_2O$, $K_2O$, $Li_2O$, $Rb_2O$, or $Cs_2O$) serve as aids in achieving low melting temperature and low liquidus temperatures, while also improving bioactivity, if needed. In some examples, the glass may comprise 0-20 mol. %, or 2.5-20 mol. %, or 2.5-17.5 mol. %, or 5-17.5 mol. %, or 5-15 mol. % $Li_2O$ or any value or range disclosed therein. In some examples, the glass may comprise 0-20 mol. %, or 2.5-20 mol. %, or 2.5-17.5 mol. %, or 5-17.5 mol. %, or 5-15 mol. % $Na_2O$ or any value or range disclosed therein. In some examples, the glass may comprise 0-20 mol. %, or 2.5-20 mol. %, or 2.5-17.5 mol. %, or 5-17.5 mol. %, or 5-15 mol. % $K_2O$ or any value or range disclosed therein.

Additional components can be incorporated into the glass to provide additional benefits or may be incorporated as contaminants typically found in commercially-prepared glass. For example, additional components can be added as coloring or fining agents (e.g., to facilitate removal of gaseous inclusions from melted batch materials used to produce the glass) and/or for other purposes. In some examples, the glass may comprise one or more compounds useful as ultraviolet radiation absorbers. In some examples, the glass can comprise 3 mol. % or less ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some examples, the glass can comprise 3 mol. % or less MgO, $P_2O_5$, $ZrO_2$, $Al_2O_3$, SrO, ZnO, divalent cation oxides (e.g., alkaline earth oxides, ZnO, etc.), or combinations thereof. In some examples, the glass can comprise from 0 to about 3 mol. %, 0 to about 2 mol. %, 0 to about 1 mol. %, 0 to 0.5 mol. %, 0 to 0.1 mol. %, 0 to 0.05 mol. %, or 0 to 0.01 mol. % ZnO, $TiO_2$, CeO, MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. The glasses, according to some examples, can also include various contaminants associated with batch materials and/or introduced into the glass by the melting, fining, and/or forming equipment used to produce the glass. For example, in some embodiments, the glass can comprise from 0 to about 3 mol. %, 0 to about 2 mol. %, 0 to about 1 mol. %, 0 to about 0.5 mol. %, 0 to about 0.1 mol. %, 0 to about 0.05 mol. %, or 0 to about 0.01 mol. % $Fe_2O_3$.

EXAMPLES

The embodiments described herein will be further clarified by the following examples.

Non-limiting examples of amounts of precursor oxides for forming the embodied glasses are listed in Table 1, along with the properties of the resulting glasses. $B_2O_3$ and $Li_2O$ was measured by ICP, and other oxides were measured by X-ray fluorescence.

TABLE 1

| Oxide (mol. %) | Comparative Example | 1 | 2 | 3 | 4 | 5 | 6 |
| --- | --- | --- | --- | --- | --- | --- | --- |
| $SiO_2$ | 75 | 76.50 | 71.59 | 67.55 | 68.06 | 69.64 | 67.38 |
| $B_2O_3$ | 20 | 19.25 | 23.88 | 23.81 | 28.28 | 22.82 | 23.97 |
| $Li_2O$ | | 0.00 | 0.00 | 0.00 | 0.00 | 0.00 | 8.59 |
| $Na_2O$ | 5 | 4.19 | 4.48 | 8.58 | 3.61 | 0.00 | 0.00 |

TABLE 1-continued

| Oxide (mol. %) | Comparative Example | 1 | 2 | 3 | 4 | 5 | 6 |
|---|---|---|---|---|---|---|---|
| $K_2O$ | | 0.00 | 0.00 | 0.00 | 0.01 | 7.49 | 0.01 |
| $SnO_2$ | | 0.05 | 0.05 | 0.04 | 0.04 | 0.05 | 0.04 |
| | | | | | | | |
| Total | | 100.00 | 100.00 | 100.00 | 100.00 | 100.00 | 100.00 |
| Density (RT) | | 2.198 | — | 2.268 | — | 2.257 | — |
| Poisson's Ratio | | 0.19 | 0.193 | 0.196 | 0.205 | 0.209 | 0.197 |
| Shear Modulus (MPsi) | | 3.52 | 3.13 | 3.84 | 2.72 | 3.42 | 3.74 |
| Young's Modulus (MPsi) | | 8.37 | 7.46 | 9.18 | 6.56 | 8.26 | 8.94 |
| Young's Modulus (GPa) | | 57.7 | 51.4 | 63.3 | 45.2 | 57.0 | 61.6 |
| Fracture Toughness | | 0.774 | — | — | — | — | — |
| $T_g$ onset (° C.) | | 471.9 | 454.6 | 504.5 | 429.3 | 494.3 | 494.4 |
| $T_{crystallization}$ peak (° C.) | | — | — | 880.2 | — | — | 781.5 |

Phase separated borosilicate glass compositions of Table 1 and novel processes for developing porous structures on glass surfaces or through the glass body are disclosed herein. All glasses were annealed at 600° C. for 45 minutes, with a cooling rate of 1-1.5° C./min. In some examples, the glasses may be anneal at a temperature in a range of 500-700° C. for a time in a range of 10 minutes to 72 hours. With a high boron content (>15 mol. %), all disclosed borosilicate glasses have a Young's Modulus less than 64 GPa, which is beneficial for bendability. In some embodiments, the means for controlling pore size and depth of porous structures include optimization of glass composition, alkali identity, and thermal treatment conditions.

For example, with respect to glass composition, in general, increasing silica ($SiO_2$) content leads to a decrease in pore size. Ammonium bifluoride (ABF) preferentially etches the silica phase, while sulfuric acid and water preferentially etch the boron and alkali phases within the glass body. Glass-etchant reaction product and kinetics play an important role in pore size developed. In general, increasing silica content improves glass chemical durability. For the materials described herein, comprising both $SiO_2$ and $B_2O_3$, there is a silica-rich phase and a boron-rich phase (phase separation). ABF or HF preferentially attacks the silica-rich phase, while $H_2SO_4$ or $H_2O$ preferentially attacks the boron-rich phase. Due to this preferential dissolution, regardless of solution chosen, pore structure may be developed. However, due to an increased silica content, the overall improvement of chemical durability will decrease the preferential dissolution rate regardless of attacking solutions. As a result, with a given time, smaller pore size is developed when increasing the silica content in the composition. In one example with respect to alkali identity, a successive increase in porosity is achieved in glasses comprising $K_2O$ versus $Na_2O$ versus $Li_2O$. $Li_2O$-containing glasses have a relatively fast reaction rate in solutions as compared to $Na_2O$- or $K_2O$-containing glasses.

For Li-containing glasses, porous layer depth may be tuned by changing solution conditions. Pores traversing a thickness of the glass sample can be achieved in both sulfuric acid and water, though it has been found that increasing thermal treatment of the glass prior to sulfuric acid and/or water dulls the effect of each in creating pores. In other words, a prior thermal treatment may lead to a glass with decreased pore size and an increased durability to both sulfuric acid and water.

In general, one condition effective at creating through-glass porous structures includes: a $Li_2O$-containing glass with lower silica contents (<70 mol. %) and a shorter thermal treatment (<5 hrs). Other conditions, in general, are more effective at creating porous structures predominantly on the glass surface; these may include: a higher silica content (>70 mol. %), a longer thermal treatment (>5 hrs), and comprising larger alkaline metals such as Na, K, or other alkaline and alkaline earth metals.

EXAMPLES

Example A: Tuning the Silica/Boron Ratio (Constant $Na_2O$ Content) to Develop Porous Structure Porous structures with pore size ranging from 20-100 nm and depth of porous structure in a range of less than 1 μm to 11 μm can be achieved by tuning the glass composition (in particular, the silica/boron ratio). Example 1 was prepared with an approximate boron:silica ratio of ~20:75 mol. % and Example 2 was prepared with an approximate boron:silica ratio of ~25:70 mol. %, with the alkali content ($Na_2O$) held constant at about ~5 mol. %. Examples 1 and 2 were exposed to ammonium bifluoride (ABF), sulfuric acid ($H_2SO_4$) and distilled water to determine weight loss, haze, and transmission. An aliquot of each leach solution was retained for inductively-coupled plasma-mass spectrometry (ICP-MS) analysis, while scanning electron microscopy (SEM) was used for surface and fractured cross-section imaging.

Figure 1D:
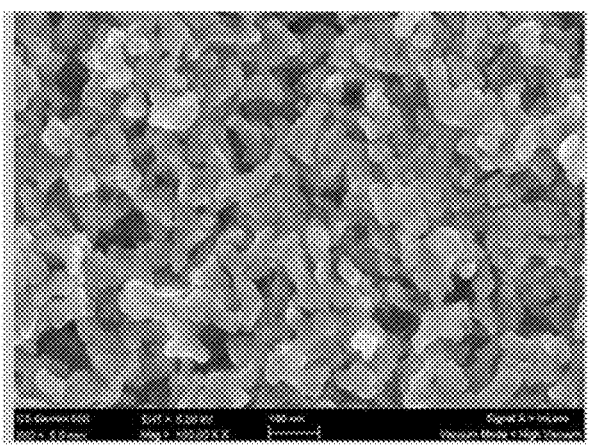
Figure 1E:
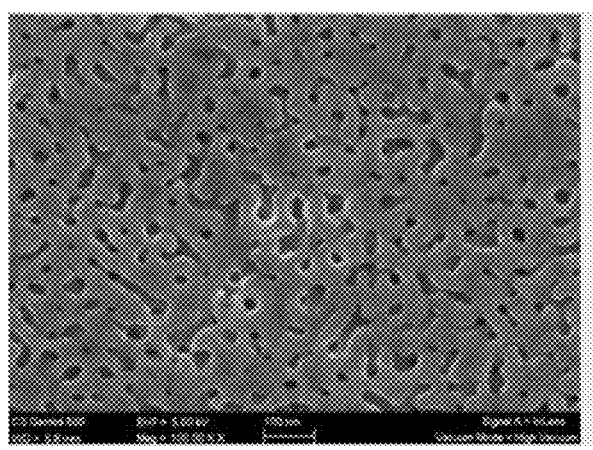
Figure 1F:
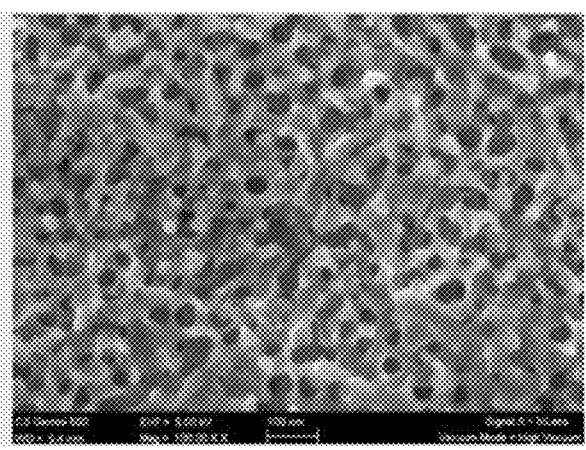

FIGS. 1A-1H illustrate top SEM images of a top (or bottom) surface of Example 1 (FIGS. 1E-1H) and Example 2 (FIGS. 1A-1D) as-received (FIGS. 1A and 1E), leached in ABF (FIGS. 1B and 1F), leached in $H_2SO_4$ (FIGS. 1C and 1G), and leached in distilled water (FIGS. 1D and 1H). Larger pores and more open pore structures are observed for Example 2 (glass with the lower silica content; FIGS. 1A-1D) as compared to Example 1 (glass with the higher silica content; FIGS. 1E-1H), regardless of leaching medium. As described above, silica helps to control the overall chemical durability of the glass. Increasing silica reduces a preferential dissolution of one phase regardless of the leaching medium. Thus, a high silica content leads to a smaller pore size.

FIGS. 2A and 2B illustrate pore size (FIG. 2A) and porous layer thickness (FIG. 2B) of Examples 1 and 2. From the SEM images of FIGS. 1A-1H, pore sizes and porous layer thicknesses were measured and shown in FIGS. 2A and 2B. Confirming the visual images of FIGS. 1A-1H, FIG. 2A shows that pore size is larger for glasses with lower silica content, independent of leaching solution treatment (e.g., control as-received sample, as well as leached samples). With respect to porous layer thickness of FIG. 2B, all three chemistries etched the porous layer to some extent, indicating that a porous layer was developed during the cleaning process which was then etched away to some degree after exposing in ABF or water, with complete removal of the leach layer observed with $H_2SO_4$ treatment.

Figures 3A, 3B:
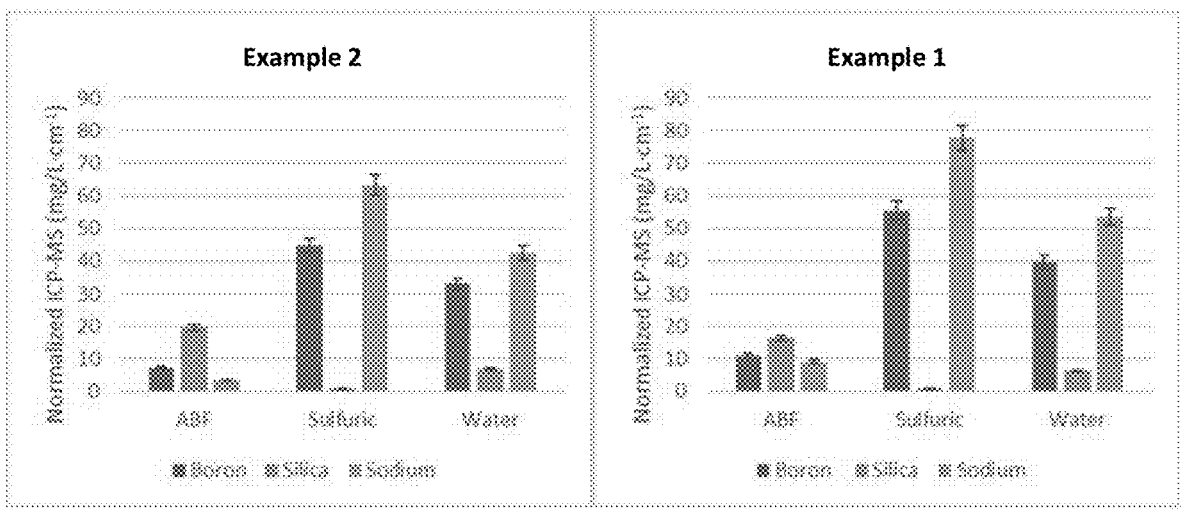
FIGS. 3A and 3B illustrate inductively-coupled plasma-mass spectrometry (ICP-MS) data of a low-silica, phase-separated glass (Example 2.

FIGS. 3A and 3B illustrate ICP-MS data of a low-silica, phase-separated glass (Example 2; FIG. 3A) and a high-silica, phase-separated glass (Example 1; FIG. 3B). Results indicate that for both the high- and low-silica phase-separated glasses, silica is preferentially leached in ABF, while boron and sodium are preferentially leached in $H_2SO_4$ and water.

Figure 4A:
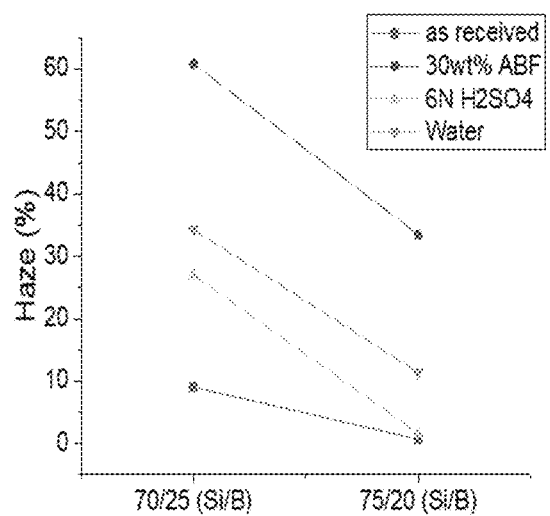
FIGS. 4A-4C illustrate haze (FIG. 4A), weight loss (FIG. 4B), and calculated porosity (FIG. 4C) of a low-silica, phase-separated glass and a high-silica, phase-separated glass, according to some embodiments.
Figure 4B:
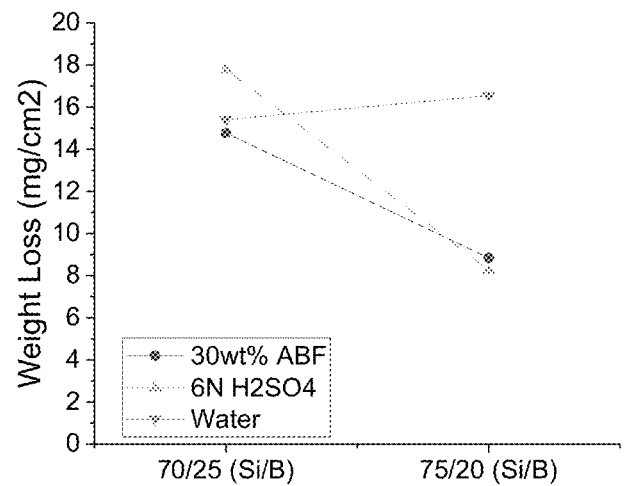
Figure 4C:
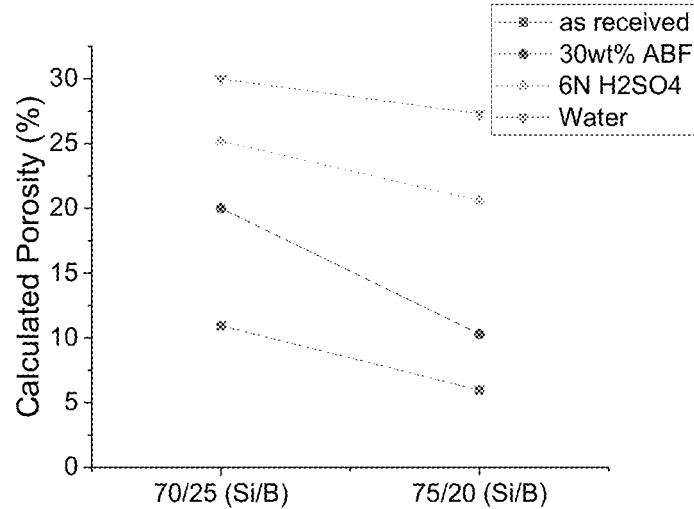

FIGS. 4A-4C illustrate haze (FIG. 4A), weight loss (FIG. 4B), and calculated porosity (FIG. 4C) of a low-silica, phase-separated glass (Example 2) and a high-silica, phase-separated glass (Example 1). FIGS. 4A and 4C illustrate a decrease in haze and calculated porosity, respectively, with increasing silica content, for all three etch chemistries. Weight loss in ABF and sulfuric acid also decreased with increasing silica content, while remaining more stable in water. As explained above, increasing silica improves the overall chemical durability of the glass. As the preferential dissolution rate is reduced with increasing silica content, weight loss (an indication of dissolution rate) is also reduced, smaller pore size is formed, leading to smaller surface roughness compared to large pore sized structures. And because haze is controlled by surface roughness, as a result, small pore size also reduces surface haze level.

Example B: Tuning the Silica/Boron Ratio (Varying Alkali Identity) to Develop Porous Structure Porous structures with pore size ranging from 1-400 nm and depth of porous structure in a range of less than 1 μm to 600 μm can be achieved by tuning the glass composition (in particular, the alkali identity). Three example glasses from Table 1 were prepared with a roughly constant boron:silica ratio of ~25:66 mol. % and alkali identity of approximately ~9 mol. %. Example 3 has an alkali identity of $Na_2O$; Example 5 has an alkali identity of $K_2O$; and Example 6 has an alkali identity of $Li_2O$. All of Examples 3, 5, and 6 were exposed to ABF, $H_2SO_4$, and distilled water to determine weight loss, haze, and transmission.

Figure 5A:
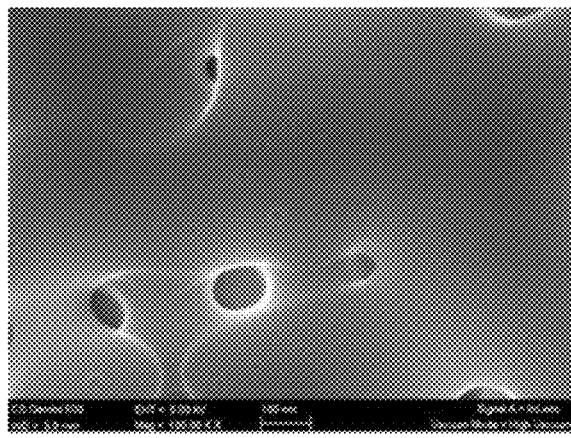
FIGS. 5A-5L illustrate top SEM images of a top (or bottom) surface of Example 6 (FIGS. 5A-5D), Example 3 (FIGS. 5E-5H), and Example 5 (FIGS. 5I-5L) as-received (FIGS. 5A, 5E, and 5I), leached in ABF (FIGS. 5B, 5F, and 5J), leached in sulfuric acid (FIGS. 5C, 5G, and 5K), and leached in water (FIGS. 5D, 5H, and 5L), according to some embodiments.
Figure 5B:
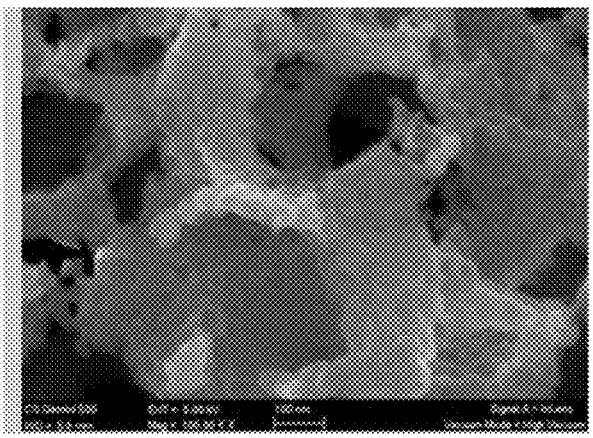
Figure 5C:
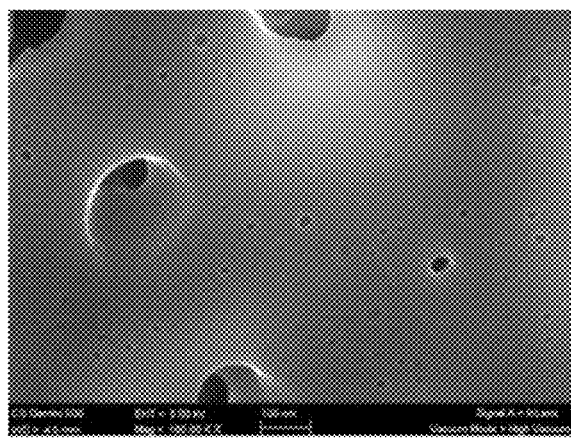
Figure 5D:
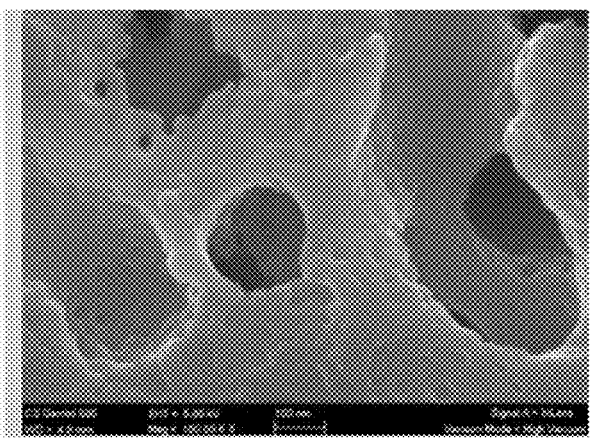
Figure 5E:
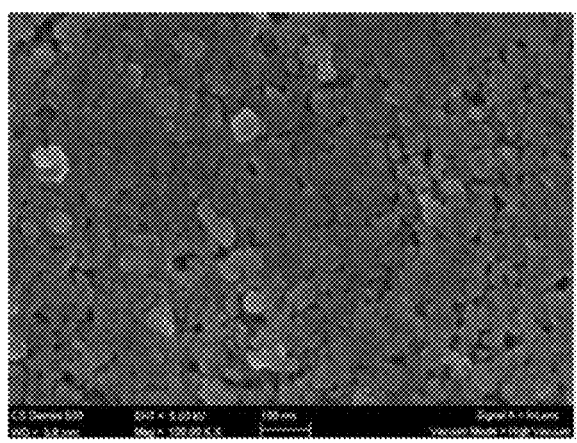
Figure 5F:
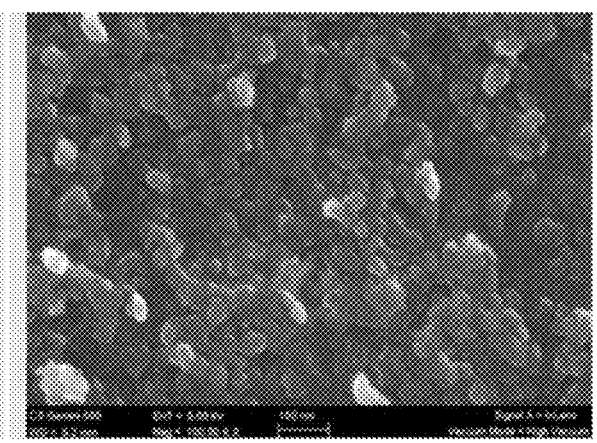
Figure 5G:
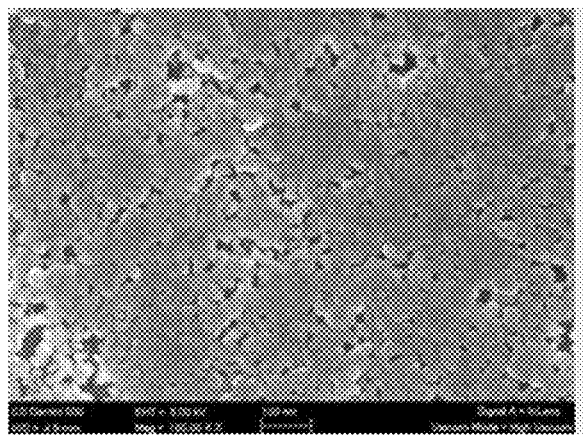
Figure 5H:
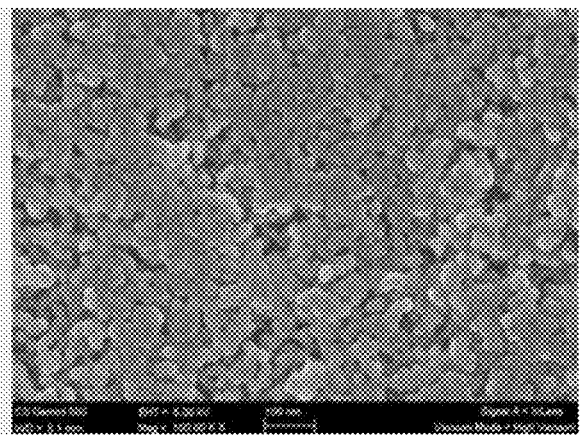
Figure 5I:
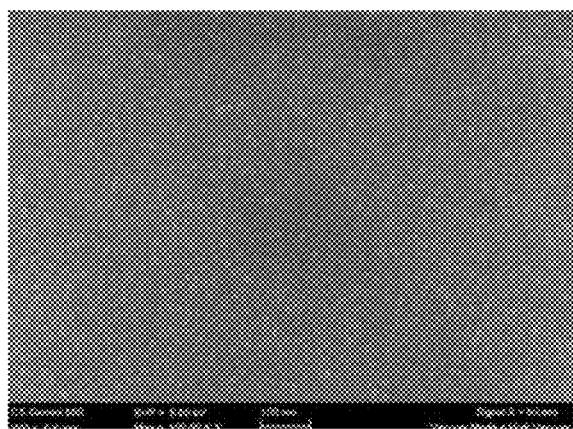
Figure 5J:
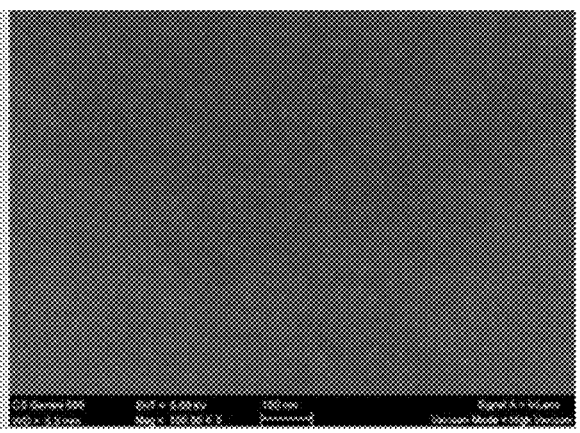
Figure 5K:
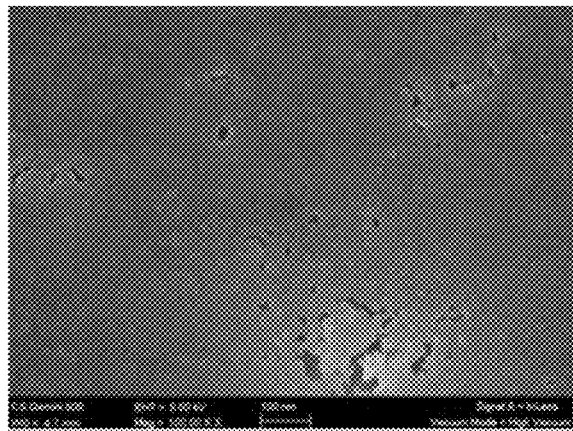
Figure 5L:
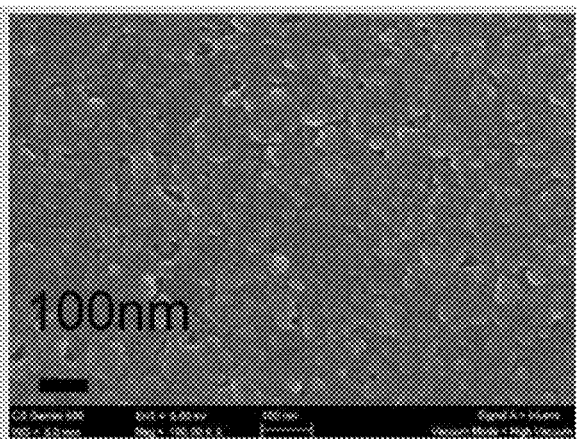

FIGS. 5A-5L illustrate top SEM images of a top (or bottom) surface of Example 6 (FIGS. 5A-5D), Example 3 (FIGS. 5E-5H), and Example 5 (FIGS. 5I-5L) as-received (FIGS. 5A, 5E, and 5I), leached in ABF (FIGS. 5B, 5F, and 5J), leached in sulfuric acid (FIGS. 5C, 5G, and 5K), and leached in water (FIGS. 5D, 5H, and 5L). Pore size increases, in increasing order, from Example 5 (comprising $K_2O$), to Example 3 (comprising $Na_2O$), to Example 6 (comprising $Li_2O$), regardless of leaching medium. In other words, pore size on the as-received (control) and all leached samples decrease as alkali identity size increases. In general, Li-containing glass has a higher packing density than Na- and K-containing glasses. A higher packing density generally leads to a higher etch rate (and thus, a larger pore size). In addition, mobility of Li ions is much higher than K ions, which also contributes to a faster dissolution rate and larger pore size.

FIGS. 6A-6D illustrate fractured cross-section SEM images of as-received Example 6 (FIG. 6A), leached in ABF (FIG. 6B), leached in sulfuric acid (FIG. 6C), and leached in water (FIG. 6D). These cross-section SEM images show a porous layer thickness of about 30 μm for the control sample (FIG. 6A), which then decreases to about 4-4.5 μm ABF (FIG. 6B). A porous structure was seen throughout the glass thickness after exposure to $H_2SO_4$ and water. Through-glass pore structures may be developed with composition of Example 6, either with $H_2SO_4$ or water, using much shortened process time and mild condition than the Comparative Example glass. Through-glass pore structures are very useful for many applications such as low dielectric circuits, doping with polymer or quantum dots to make complex materials, adsorbing noise, etc.

Figures 7A, 7B:
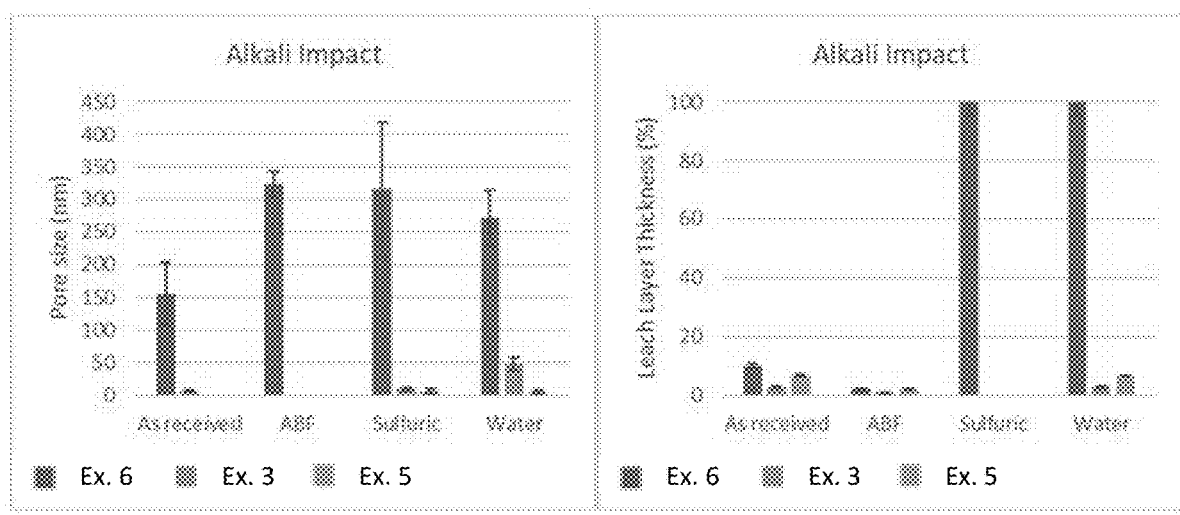
FIGS. 7A and 7B illustrate pore size (FIG. 7A) and porous layer thickness (FIG. 7B) of Examples 3, 5, and 6, according to some embodiments.

FIGS. 7A and 7B illustrate pore size (FIG. 7A) and porous layer thickness (FIG. 7B) of Examples 3, 5, and 6. From the SEM images of FIGS. 5A-5L, pore sizes and porous layer thicknesses were measured and shown in FIGS. 7A and 7B. Confirming the visual images of FIGS. 5A-5L, FIG. 7A shows that pore size is larger for glasses with smaller alkali identity size, independent of leaching solution treatment. In other words, pore size is the greatest in Example 6, comprising $Li_2O$, versus glasses comprising larger alkali identities (Example 3, comprising $Na_2O$; Example 5, comprising $K_2O$). Pore size decreases as alkali size increases. With respect to porous layer thickness of FIG. 7B, for Li-containing glasses (Example 6), porosity was evident throughout the thickness of the sample after leaching in both $H_2SO_4$ and water. This is further evidenced in FIGS. 6C and 6D, which shows fractured cross-section SEM images Example 6 leached in sulfuric acid (FIG. 6C) and leached in water (FIG. 6D). Glass dissolution rate can vary depending on alkali identity. Li-containing glass leads to a relatively faster etch rate, a thicker leach layer, and larger pore size than Na- and K-containing glasses, for the same etching condition. This may be related to glass packing density and mobility of alkali ions in glass network.

Figures 8A, 8B:
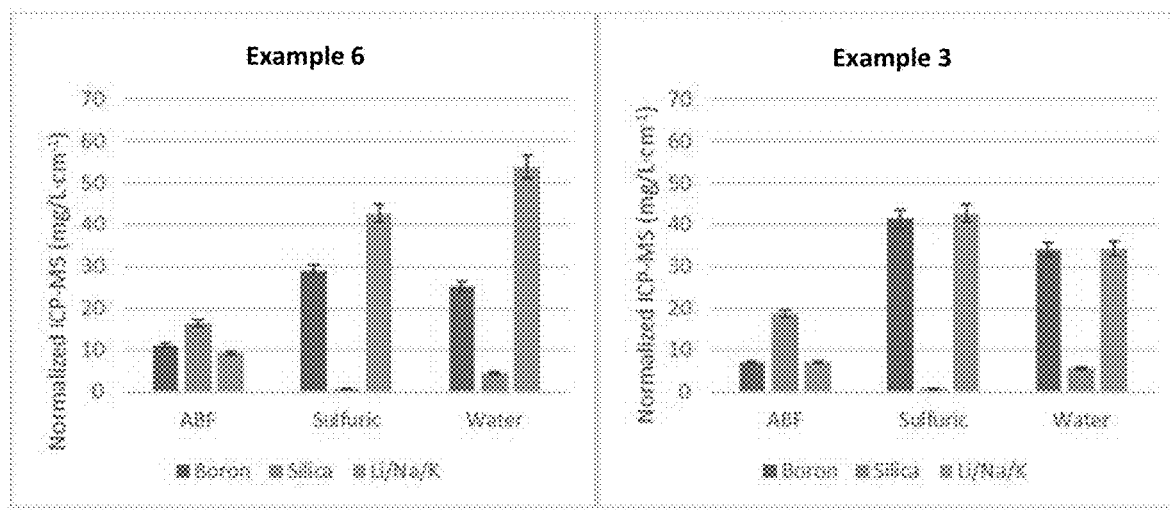
FIGS. 8A-8C illustrate ICP-MS data of phase-separated glass containing lithium (Example 6.
Figure 8C:
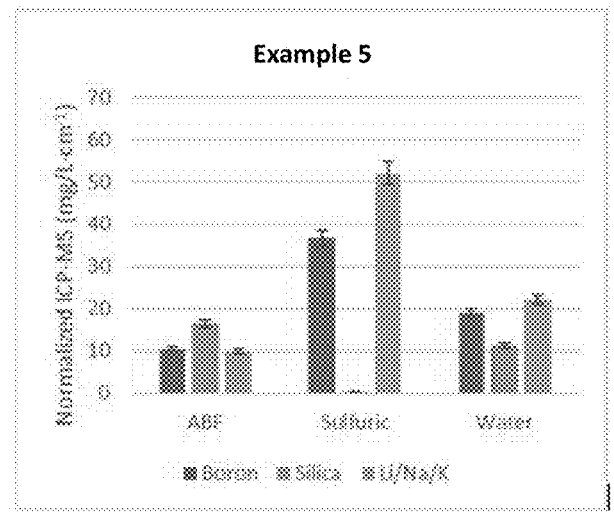

FIGS. 8A-8C illustrate ICP-MS data of phase-separated glass containing lithium (Example 6; FIG. 8A), sodium (Example 3, FIG. 8B), and potassium (Example 5, FIG. 8C). Results indicate that for all three glasses, independent of alkali identity, silica is preferentially leached in ABF while boron and sodium are preferentially leached in $H_2SO_4$ and water. Moreover, for Example 3, the sodium-containing glass, sodium and boron leached at roughly the same rate in all leaching mediums, while for Example 5 (potassium-containing glass) and Example 6 (lithium-containing glass), the alkali leached at a faster rate than boron in $H_2SO_4$ and water.

Example C: Tuning the Thermal Treatment Condition to Develop Porous Structure

Porous structures with pore size ranging from 20-50 nm and depth of porous structure in a range of less than 1 μm to 30 μm can be achieved by tuning thermal treatment. Two example glasses from Table 1 were prepared with roughly equivalent compositions but varying thermal treatments. Both the Comparative Example and Example 1 have roughly 75 mol. % $SiO_2$, 20 mol. % $B_2O_3$, and 5 mol. % $Na_2O$. After the thermal treatment, each was exposed to ABF, $H_2SO_4$, and distilled water to determine weight loss, haze, and transmission. An aliquot of each leach solution was retained for ICP-MS analysis, while the glasses were observed by SEM for surface and fractured cross-section imaging.

Figure 9:
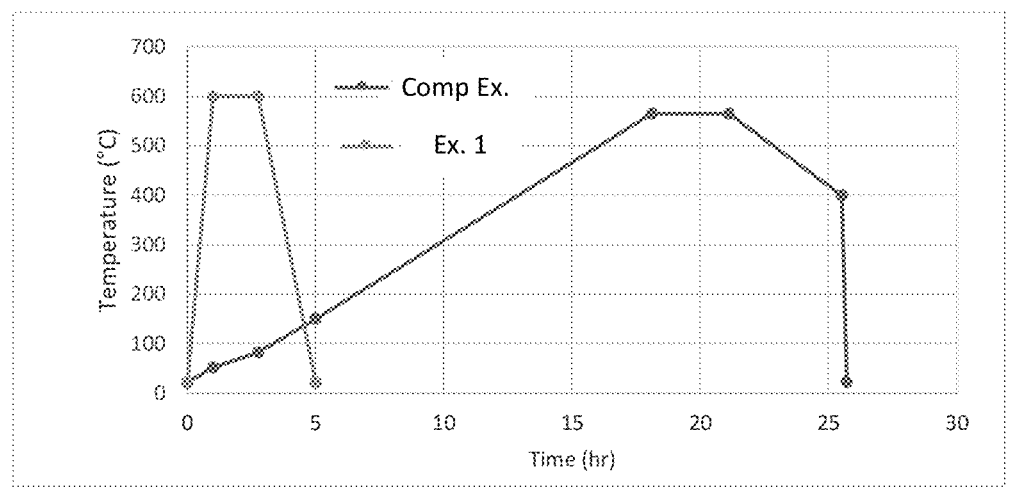
FIG. 9 illustrates thermal treatments of Comparative Example and Example 1, according to some embodiments.

FIG. 9 illustrates thermal treatments of Comparative Example and Example 1 to study the impact of thermal treatment on glass durability. The thermal treatment for Example 1 had a total time lapse of about 5 hours with a rapid temperature ramp to 600° C., holding for 30 min to 1.5 hrs (e.g., 45 min), and then decreasing back to room temperature at a cooling rate of, for example, 1-1.5° C./min or 5° C./min. While ramp rate is adjusted based on sample size and furnace thermal control to prevent thermal shock from the thermal treatment, in addition to phase separation control, in some embodiments, the ramp rate may be in a range of 5-15° C./min (e.g., 10° C./min). The thermal treatment for Comparative Example had a total time lapse exceeding 24 hrs, with a much more gradual ramp rate achieving a maximum thermal treatment temperature (~575° C.) after approximately 18 hrs. After holding for [Insert time], cooling to room temperature is achieved in a two-step process, with a first step gradually decreasing from the maximum thermal treatment temperature to about 400° C. followed by a sharp decrease from 400° C. to room temperature.

Figure 10A:
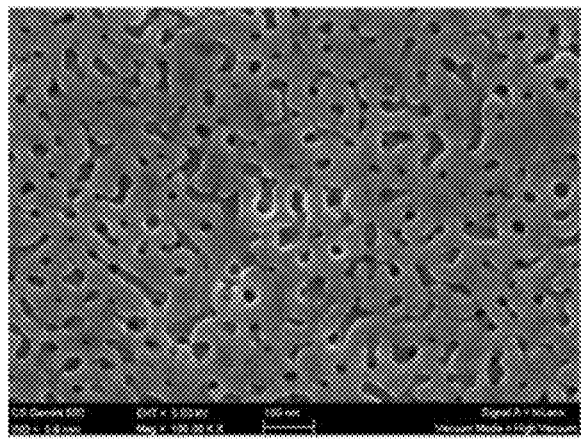
Figure 10B:
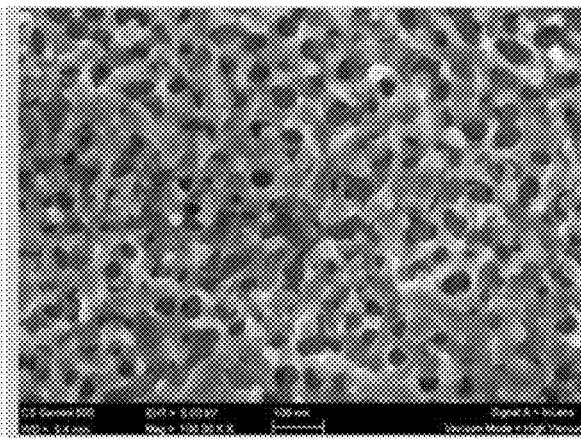
Figure 10C:
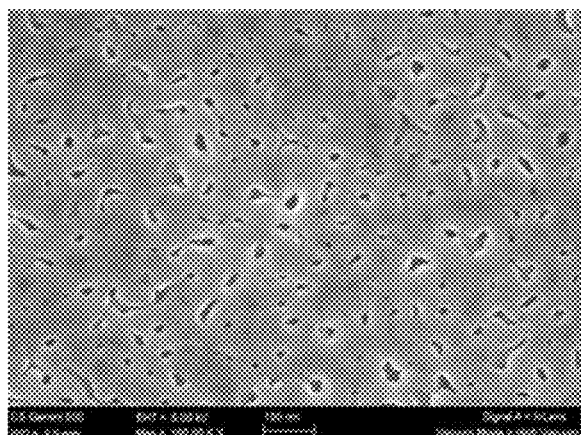
Figure 10D:
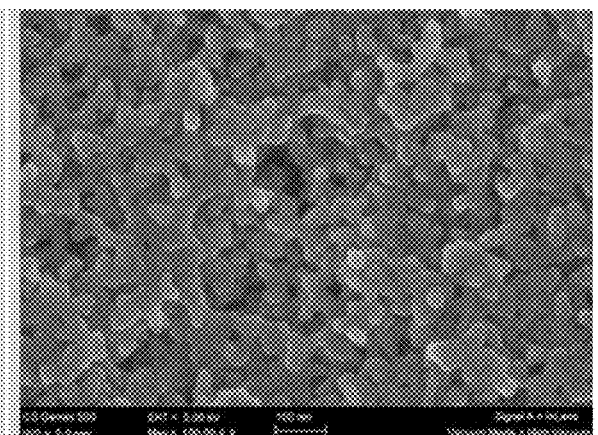
Figure 10E:
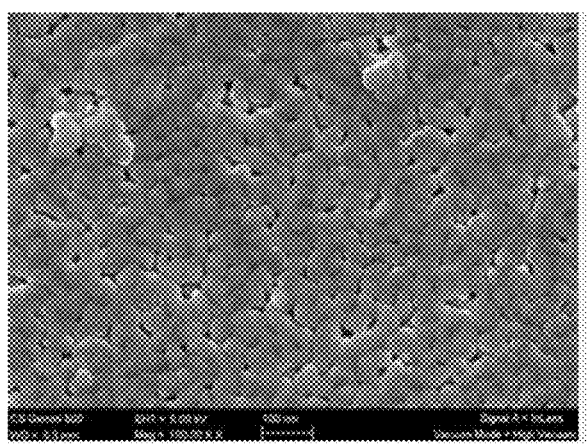
Figure 10F:
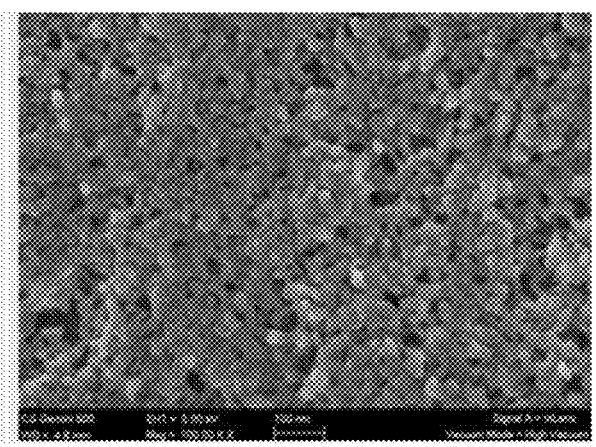

FIGS. 10A-10H illustrate top SEM images of a top (or bottom) surface of Example 1 (FIGS. 10A-10D) and Comparative Example (FIGS. 10E-10H) as-received (FIGS. 10A and 10E), leached in ABF (FIGS. 10B and 10F), leached in sulfuric acid (FIGS. 10C and 10G), and leached in water (FIGS. 10D and 10H). Results indicate that Example 1, which has a shorter thermal treatment cycle, has larger pores and a more open glass structure, as compared to Comparative Example, which has a longer thermal treatment cycle. During the annealing process, glass structure is reorganized. A shorter thermal treatment time does not tend to provide the glass sufficient time to fully organized and will lead to more open structures. As a result, glass can be more easily attacked and forms a large pore size.

FIGS. 11A and 11B illustrate pore size (FIG. 11A) and porous layer thickness (FIG. 11B) of Example 1 and Comparative Example. From the SEM images of FIGS. 10A-10H, pore sizes and porous layer thicknesses were measured and shown in FIGS. 11 and 11B. Confirming the visual images of FIGS. 10A-10H, FIG. 11A shows, in general, that pore size is larger for glasses experiencing a shorter thermal treatment cycle (e.g., control as-received sample, as well as leached samples). With respect to porous layer thickness of FIG. 11B, no leach layer was observed for the as-received, ABF-treated, and water-treated Comparative Example, as well as for the $H_2SO_4$-treated Example 1. Porous structures can be developed on as-made glasses described herein even without additional heat (i.e., thermal) treatment due to phase separation during glass forming. This is an improvement compared to the traditional glasses (e.g., Comparative Example) and significantly shortens process time while saving cost.

Figures 12A, 12B:
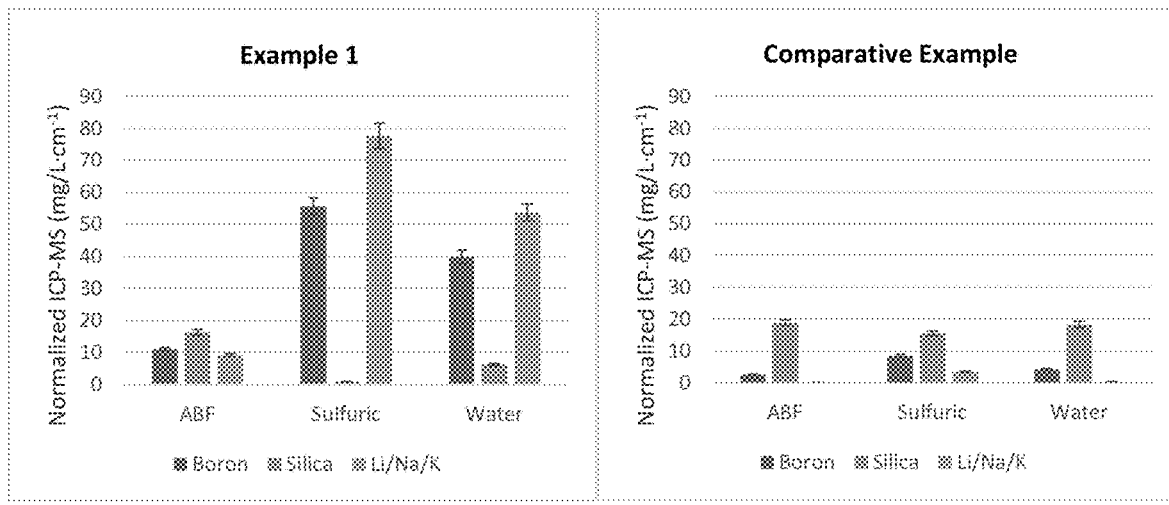
FIGS. 12A and 12B illustrate ICP-MS data of phase-separated glass with a short thermal treatment (Example 1.

FIGS. 12A and 12B illustrate ICP-MS data of phase-separated glass with a short thermal treatment (Example 1; FIG. 12A) and a long thermal treatment (Comparative Example; FIG. 12B). Results indicate that the Comparative Example (with a longer thermal treatment) was less likely to form a desired pore structure than Example 1 (with a shorter thermal treatment) due to condensation of the Comparative Example glass network.

Example D: Experimental

Materials: Sulfuric acid ($H_2SO_4$) and nitric acid ($HNO_3$) were obtained from Fisher Chemicals (Hampton, NH). Sulfuric acid solutions (6N) were prepared by diluting 168 mL concentrated sulfuric acid to 1 L with distilled water. Nitric acid solutions (2N) were prepared by diluting 127 mL concentrated nitric acid to 1 L with distilled water. Ammonium bifluoride (ABF) was obtained from J.T. Baker Inc. (owned by Fisher Chemicals, Hampton, NH). ABF solutions (30 wt %) were prepared by dissolving 300 g of solid ABF in 1 L distilled water. The solution was stirred until all solid was dissolved.

Glass Melting: Glass was melted through double melts at AMPL. The glass pours were annealed at 600° C. Samples were ground and polished at G&P shop at Corning to 0.5 mm, followed by some designed thermal treatments. The glasses with and without thermal treatment were treated in the chemical durability lab for further study. The thermal treatment and annealing procedures are included in the following section.

Sample treatment at chemical durability lab: Glass samples (25.4×25.4×0.5 mm) were labeled (laser scribe) and cleaned prior to leaching. The cleaning process included a five minute rinse with distilled water, followed by a two minute soak in a 4 wt % SemiClean detergent wash at 60° C. with ultrasonication. The samples were again rinsed with distilled water for 5 minutes and given a final rinse in 18 MΩ water before drying at 110° C. for at least one hour. The glass samples were weighed and baseline optical measurements were taken before acid leaching. Reported weight loss values were normalized to surface area (Equation 1).

$$\text{Normalized weight loss} \left(\frac{mg}{cm2}\right) = \frac{\text{Initial weight(mg)} - \text{Final Weight(mg)}}{\text{Surface Area (cm2)}} \quad \text{Equation 1}$$

Glass Leaching: ABF leaching was carried out in Teflon containers containing 200 mL of 30 wt % ABF in a 22° C. water bath with ultrasonication for 10 minutes. ABF leaching was followed by a rinse in 2N $HNO_3$ for 10 minutes at 22° C. Sulfuric acid leaching was carried out in Teflon containers containing 200 mL $H_2SO_4$ in a 98° C. oven for 2 hours. Water leaching was carried out in Teflon containers containing 200 mL distilled water in a 95° C. oven with stirring for 24 hours. After leaching, all samples were rinsed thoroughly with distilled water and given a final rinse in 18 MΩ water before drying at 110° C. for at least one hour. After cooling, a final weight measurement was obtained (normalized to surface area, report in mg/cm²), and the final optical properties of the leached glass were obtained. Aliquots of each leach solution was retained for ICP-MS analysis.

Optical measurements: Optical measurements (haze and transmission) were obtained using an X-rite Ci7800 Spectrophotometer (Grand Rapids, MI) and its associated Color iControl software package.

Calculated Porosity: As the sample size was too small for mercury porosimetry measurements, porosity of the samples was calculated using Equation 2, where weight is the final weight after wet chemistry treatment, dimensions are final sample dimensions and density is density of the original glass.

$$\text{Porosity}(\%) = 1 - \left(\frac{\text{Weight}(g) / \text{Density}\left(\frac{g}{cm2}\right)}{\text{Length(cm)} \times \text{Width(cm)} \times \text{Thickness(cm)}}\right) \quad \text{Equation 2}$$

Inductively Coupled Plasma-Mass Spectroscopy (ICP-MS) analysis: An Agilent 7700s ICP-MS was used to analyze all ABF, $H_2SO_4$ and water leach solutions. Samples were prepared and analyzed in duplicate, with concentration of leached elements reported in mg/L (ppm). ICP-MS results were normalized to bulk glass concentration (Equation 3).

$$\text{Normalized concentration}(\text{mg}/L \cdot \text{cm} - 1) = \quad \text{Equation 3}$$

$$\frac{\text{Concentration}\left(\frac{\text{mg}}{L}\right) / \text{Bulk glass composition}(\text{wt\%})}{\text{Surface area}(\text{cm}^2)/\text{Volume}(L)}$$

Scanning Electron Microscopy (SEM) analysis: A Zeiss Gemini 500 SEM was used to obtain both surface and fractured cross section images of both leached and unleached samples. These images were obtained at 5 kV and 10 kV at magnifications that ranged from 500×-100,000×. A conductive carbon coating was applied to the samples to reduce surface charging. These images were used to analyze pore size and the depth of the porous layer.

Example E: Glass Making Processes

Glasses having the oxide contents listed in Table 1 can be made via traditional methods. For example, in some examples, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1100° C. to 1400° C. for times ranging from about 6 hours to 24 hours. The melts can thereafter be poured into steel molds to yield glass slabs. Subsequently, those slabs can be transferred immediately to an annealer operating at about 400° C. to 700° C., where the glass is held at temperature for about 0.5 hour to 3 hours and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to 1400° C. and held at temperature for about 6 hours to 16 hours. The resulting glass melts are then poured onto a steel table to cool. The precursor glasses are then annealed at appropriate temperatures.

The embodied glass compositions can be ground into fine particles in the range of 1-10 microns (μm) by air jet milling or short fibers. The particle size can be varied in the range of 1-100 μm using attrition milling or ball milling of glass frits. Furthermore, these glasses can be processed into short fibers, beads, sheets or three-dimensional scaffolds using different methods. Short fibers are made by melt spinning or electric spinning; beads can be produced by flowing glass particles through a hot vertical furnace or a flame torch; sheets can be manufactured using thin rolling, float or fusion-draw processes; and scaffolds can be produced using rapid prototyping, polymer foam replication and particle sintering. Glasses of desired forms can be used to support cell growth, soft and hard tissue regeneration, stimulation of gene expression or angiogenesis.

Continuous fibers can be easily drawn from the claimed composition using processes known in the art. For example, fibers can be formed using a directly heated (electricity passing directly through) platinum bushing. Glass cullet is loaded into the bushing, heated up until the glass can melt. Temperatures are set to achieve a desired glass viscosity (usually <1000 poise) allowing a drip to form on the orifice in the bushing (Bushing size is selected to create a restriction that influences possible fiber diameter ranges). The drip is pulled by hand to begin forming a fiber. Once a fiber is established it is connected to a rotating pulling/collection drum to continue the pulling process at a consistent speed. Using the drum speed (or revolutions per minute RPM) and glass viscosity the fiber diameter can be manipulated—in general the faster the pull speed, the smaller the fiber diameter. Glass fibers with diameters in the range of 1-100 μm can be drawn continuously from a glass melt. Fibers can also be created using an updraw process. In this process, fibers are pulled from a glass melt surface sitting in a box furnace. By controlling the viscosity of the glass, a quartz rod is used to pull glass from the melt surface to form a fiber. The fiber can be continuously pulled upward to increase the fiber length. The velocity that the rod is pulled up determines the fiber thickness along with the viscosity of the glass.

Thus, as presented herein, this disclosure presents improved inorganic compositions for foldable display applications. A new alkali borosilicate glass composition is disclosed with >0-20 mol. % alkali oxide ($Na_2O$, $Li_2O$ or $K_2O$), and further comprising 50-85 mol. % $SiO_2$, 10-40 mol. % $B_2O_3$, and >0-5 mol. % $SnO_2$. Moreover, a novel green process is used to fabricate either surface or through-glass porous structures with the new composition. By tuning glass composition, thermal treatment, and wet dissolution conditions (ammonium bifluoride, mineral acids, or $H_2O$), a uniform, connected porous structure is achieved with pore size tunable in a range of 10-350 nm and porous layer thickness controllable in a range of sub-μm to more than 600 μm (or 2-100% of glass thickness). By tuning alkali content, the pore structure can be enlarged and a through-glass pore structure can be developed by soaking the glasses in either mineral acid (such as $H_2SO_4$) or hot water. Pore structure and porosity can also be enlarged and increased by reducing the SUB ratio. Lastly, by tuning thermal treatment condition and shortening the heat treatment time, the pore structure can be further enlarged as fixing the glass composition.

Advantages include: (1) tunable pore size and porous layer thickness on glass to enable different material properties and applications. For example, glass with surface porous structure may be used in RF and AR applications, while through-glass porous structure can be used for air filtration, catalyst carrier, foldable display (after being infiltrated with organic polymer), slow release drug carrier, or sound filter applications. Other applications include adsorbents, microcarriers, separation membrane, and optical materials; (2) new green chemistry to develop the porous structure with shortened process time. In the Comparative Example, a nearly 24 hr heat treatment and overnight dissolution in $H_2SO_4$ is needed to develop the porous structure, while here new compositions and a new process is developed which allows a shortened 5 hr heat treatment and 2 h-soaking in $H_2SO_4$ to develop the through-glass porous structure; and (3) the porous silica structure has improved optical, electrical and magnetic properties and is durable and easy to implement.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

References herein to the positions of elements (e.g., "top," "bottom," "above," "below," "first," "second," etc.) are merely used to describe the orientation of various elements in the FIGURES. It should be noted that the orientation of various elements may differ according to other exemplary embodiments, and that such variations are intended to be encompassed by the present disclosure. Moreover, these relational terms are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As utilized herein, "optional," "optionally," or the like are intended to mean that the subsequently described event or circumstance can or cannot occur, and that the description includes instances where the event or circumstance occurs and instances where it does not occur. As used herein, the indefinite articles "a," "an," and the corresponding definite article "the" mean "at least one" or "one or more," unless otherwise specified. It also is understood that the various features disclosed in the specification and the drawings can be used in any and all combinations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

Unless otherwise specified, all compositions are expressed in terms of as-batched weight percent (mol. %). As will be understood by those having ordinary skill in the art, various melt constituents (e.g., silicon, alkali- or alkaline-based, boron, etc.) may be subject to different levels of volatilization (e.g., as a function of vapor pressure, melt time and/or melt temperature) during melting of the constituents. As such, the as-batched weight percent values used in relation to such constituents are intended to encompass values within ±0.5 mol. % of these constituents in final, as-melted articles. With the forgoing in mind, substantial compositional equivalence between final articles and as-batched compositions is expected.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A borosilicate-based composition, comprising:
   50-85 mol % $SiO_2$,
   >15-30 mol % $B_2O_3$,
   >0-5 mol % $SnO_2$, and
   5.5-20 mol % $R_2O$, where $R_2O$ is a total amount of $Li_2O$, $Na_2O$, $K_2O$, $Rb_2O$, and $Cs_2O$,
   wherein the composition has a Young's Modulus less than 64 GPa, and the borosilicate-based composition is phase separated into a silicate glass and a borate glass.

2. The borosilicate-based composition of claim 1, wherein $R_2O$ includes $Li_2O$ present in an amount of 2-10 mol %.

3. A through-glass porous structure comprising the borosilicate composition of claim 2 as a glass body with a porous structure extending through the glass body.

4. The porous structure of claim 3, having a pore size in a range of 100-400 nm and a depth of porous structure in a range of 50 μm to 600 μm.

5. The porous structure of claim 3, comprising a boron:silica ratio in a range of 0.1:1 to 0.5:1.

6. The through-glass porous structure of claim 3, further comprising a polymer, quantum dots, or a combination thereof within the porous structure.

7. The borosilicate-based composition of claim 1, wherein $R_2O$ includes $Na_2O$ present in an amount of 2-10 mol %.

8. The borosilicate-based composition of claim 1, wherein $R_2O$ includes $K_2O$ present in an amount of 2-10 mol %.

9. A glass surface porous structure comprising the borosilicate composition of claim 1, wherein $R_2O$ includes at least one of 2-10 mol % $Na_2O$ or 2-10 mol % $K_2O$.

10. The porous structure of claim 9, having a pore size in a range of 20-100 nm and a depth of porous structure in a range of less than 1 μm to 20 μm.

11. The porous structure of claim 9, having a pore size in a range of 20-75 nm and a depth of porous structure in a range of less than 1 μm to 30 μm.

12. A foldable display device comprising the borosilicate composition of claim 1.

13. The borosilicate-based composition of claim 1, wherein the borosilicate-based composition is free of $Al_2O_3$.

14. The borosilicate-based composition of claim 1, wherein the borosilicate-based composition comprises 5.5-10 mol % $R_2O$.

15. A method for manufacturing a glass substrate, comprising:
   providing a glass article; and
   thermally treating the glass article to a maximum temperature in a range of 500-750° C.,
   wherein the glass article is phase separated into a silicate glass and a borate glass, and the glass article comprises:
      50-85 mol % $SiO_2$,
      >15-30 mol % $B_2O_3$,
      >0-5 mol % $SnO_2$, and
      5.5-20 mol % $R_2O$, where $R_2O$ is a total amount of $Li_2O$, $Na_2O$, $K_2O$, $Rb_2O$, and $Cs_2O$.

16. The method of claim 15, wherein $R_2O$ includes at least one of 2-10 mol % $Na_2O$ or 2-10 mol % $K_2O$.

17. The method of claim 15, wherein the step of thermally treating comprises:
   a ramping sub-step of heating the glass article from room temperature to the maximum temperature;
   a holding sub-step of maintaining the glass article at the maximum temperature; and a cooling sub-step of cooling the glass article from the maximum temperature to room temperature.

18. The method of claim 15, wherein the glass substrate has a porous structure having a pore size in a range of 20-75 nm and a depth of porous structure in a range of less than 1 µm to 30 µm.

19. The method of claim 15, further comprising etching the thermally treated glass article to create the glass substrate as a through-glass porous structure having a pore size in a range of 100-400 nm and a depth of porous structure in a range of 50 µm to 600 µm.

20. The method of claim 19, further comprising infiltrating the through-glass porous structure with a polymer, quantum dots, or a combination thereof.

* * * * *